July 12, 1960 O. G. JEDDELOH Re. 24,843

SHEET LOADING MECHANISM FOR MULTIDECK CONVEYOR

Original Filed May 5, 1958 4 Sheets-Sheet 1

INVENTOR.
Otto G. Jeddeloh
BY
Ramsey and Holcombe
Attys.

SHEET LOADING MECHANISM FOR MULTIDECK CONVEYOR

Original Filed May 5, 1958 4 Sheets-Sheet 2

INVENTOR.
Otto G. Jeddeloh
BY
Ramsey and Kolisch
Attys.

SHEET LOADING MECHANISM FOR MULTIDECK CONVEYOR

Original Filed May 5, 1958 4 Sheets-Sheet 3

INVENTOR.
Otto G. Jeddeloh
BY
Ramsey and Kolisch
Attys.

SHEET LOADING MECHANISM FOR MULTIDECK CONVEYOR

Original Filed May 5, 1958 4 Sheets-Sheet 4

INVENTOR.
Otto G. Jeddeloh
BY
Ramsey and Kolisch
Attys.

United States Patent Office

Re. 24,843

Reissued July 12, 1960

24,843

SHEET LOADING MECHANISM FOR MULTIDECK CONVEYOR

Otto G. Jeddeloh, P.O. Box 518, Gold Hill, Oreg.

Original No. 2,876,009, dated Mar. 3, 1959, Ser. No. 733,062, May 5, 1958. Application for reissue May 25, 1959, Ser. No. 815,762

10 Claims. (Cl. 271—64)

Matter enclosed in heavy brackets [ ] appears in the original patent but forms no part of this reissue specification; matter printed in italics indicates the additions made by reissue.

This invention relates generally to sheet handling mechanism, and more particularly to a sheet loading and feeding mechanism for a multideck conveyor assembly comprised of stacked conveyor sections, wherein the sheets are fed to the conveyor sections fully to load the sections without leaving large open spaces thereon. The invention contemplates apparatus having a loading conveyor mechanism for feeding sheets to an appropriate deck, wherein a maximum amount of time is allowed to load the unloading conveyor mechanism during a loading cycle. The loading conveyor mechanism is characterized by a number of features which contribute to quick response in the mechanism and reduced space requirements.

In the manufacture of products from veneer sheets, the sheets ordinarily are dried by stacking the sheets on a multideck conveyor assembly which transports the sheets through a drier. Maximum utilization of the drier requires that the sheets be fed to the drier with each deck of the conveyor assembly fully loaded.

Apparatus heretofore known for loading stacked conveyor sections have been characterized by a number of disadvantages. Some have employed an elongated feeding conveyor having a length substantially greater than that of the sheets handled, and having infeed and outfeed ends movable up and down to accommodate changes at one end in the height of a veneer stack and to permit shifting of the other end into registry with the conveyor sections. A long feeding conveyor has been necessary in order to lessen the maximum incline over which a sheet must travel in passing from a veneer stack to a conveyor section. This type of conveyor has to be driven at rapid speeds in order for the conveyor to keep up with the stacked conveyor sections of the multideck receiving assembly. Further, complicated control mechanism is required to prevent the outfeed end of the feeding conveyor from moving out of registry with the infeed end of a particular conveyor section prematurely, and to prevent premature loading of the feeding conveyor prior to proper alignment of the outfeed end of the conveyor.

Another type of apparatus is known which employs a massive elevator supporting a stack of veneer sheets, which is moved up and down to align the top of a veneer stack with successive conveyor sections of the multideck receiving assembly. The mechanism usually includes a transfer mechanism for transporting a sheet forward from a stack. This type of construction has resulted in savings in space, but it has the obvious disadvantage of requiring large amounts of power for operation and is susceptible to breakdown, as the veneer stack is moving up and down continuously.

Constructions which use a large number of motors and controls alternately starting and stopping the motors are susceptible to repeated motor failures. Also intricate controls are a requirement, to assure that all motors operate in proper sequence.

This invention contemplates a feeding mechanism for a multideck conveyor assembly which comprises a relatively short loading conveyor mechanism pivoted at one end for pivotal movement about a fixed axis. The outfeed end of the mechanism swings up and down into and out of registry with successive sections of the multideck conveyor assembly. With three to eight foot veneer lengths, a pivoted loading conveyor mechanism slightly less than four feet in length is quite satisfactory. During the feeding of a sheet, the loading mechanism only partially supports the sheet. The mechanism is used primarily to direct a sheet from a stack into an appropriate conveyor section, and to impart to the sheet sufficient impetus for the sheet to clear the stack and move onto a conveyor section.

The loading conveyor mechanism is provided at each of its ends with opposed clamping rolls positively grabbing opposite faces of a sheet transported by the mechanism, and each operating to move a sheet independently of the other. One set of rolls is employed to move a sheet onto the loading conveyor, and the other to clear a sheet from the loading conveyor. Since the sheet is longer than the loading conveyor and is grabbed on opposite faces by the clamping rolls, the sheet can travel up relatively steep inclines. The infeed end of the loading conveyor mechanism pivots about an axis which is at an elevation spaced substantially centrally between the elevations of the lower and uppermost conveyor sections of the multideck conveyor assembly. This has the effect of reducing the maximum incline over which a sheet must travel.

As the infeed end is stationary, a motor to position the infeed end is unnecessary. Veneer sheets to be fed to the loading conveyor mechanism are stacked on an elevatable support on the infeed side of the loading conveyor. This support or platform is raised only to compensate for a decrease in height of a stack as veneer sheets are pulled off the stack, so the motor producing movement of the platform is actuated relatively infrequently.

A further feature and object of the invention is the provision of an operator's carriage rearwardly of the elevatable support movable to and fro from one side of a stack to the other during operation of the aparatus. The carriage moves in one pass between its side limit positions during the loading cycle of the loading conveyor. During the charging cycle when the veneer is fed to a deck of the multideck conveyor, the carriage is stationary and occupying one of its side limit positions. A continuously operating motor is utilized to move the carriage, and a novel lost motion connection employed to provide a proper delay in movement of the carriage when it reaches a side limit position. Thus heating and wear of this motor is substantially reduced, and complicated control circuitry eliminated.

Other features and objects include novel hoist or elevator means swinging the free or nonpivoted end of the loading conveyor mechanism up and down. This elevating means comprises a pair of cams driven by the motor driving the conveyor sections of the multideck conveyor assembly. Each cam has a cam edge defining a plural number of step portions corresponding to the number of decks in the receiving conveyor assembly and offset from the rotation axis of the cam at unequal distances. The cams are continuously rotating, and up and down movement of the loading conveyor is produced without starting and stopping of a hoist motor. The step portions of a cam permit the free end of the loading conveyor to slow down in its vertical movement when the end moves into registry with one of the decks of the multideck receiving conveyor. The step portions of a cam are curved in outline, however the outlines do not arc about the rotation axis of a cam, but instead define sweeps which recede from the cam rotation axis. When the cams are rotated to lift the loading conveyor, the loading conveyor moves up continuously, but at two different rates of speed. The absence of any "dwell" in the loading conveyor during raising of the conconveyor prevents any backlash from occurring in the parts driving the cam and contributes to smoothness and accuracy in the setting of the loading conveyor.

Feeding of the multideck assembly by the loading conveyor mechanism is correlated with movement of the cams. A swingable fence at the infeed end of the loading conveyor swings out of the way to permit the transport of veneer sheets through the loading conveyor during charging of the multideck assembly. This fence moves back to a shut off position before veneer is moved clear of the fence. The fence is equipped with a follower that rides over the top faces of the veneer, and as soon as the veneer passes beyond the fence and follower, the follower drops down to prevent feeding of sheets into the loading conveyor mechanism. The fast action of the fence and follower makes possible a loading time for the loading conveyor of maximum duration. This is important when it is remembered that the loading conveyor is relatively short and consequently is driven at a slower speed than the speeds used with conventional elongated conveyors.

Other objects, novel features and advantages will become apparent as the following description is read in conjunction with the accompanying drawings, wherein.

Figures 1, 2:
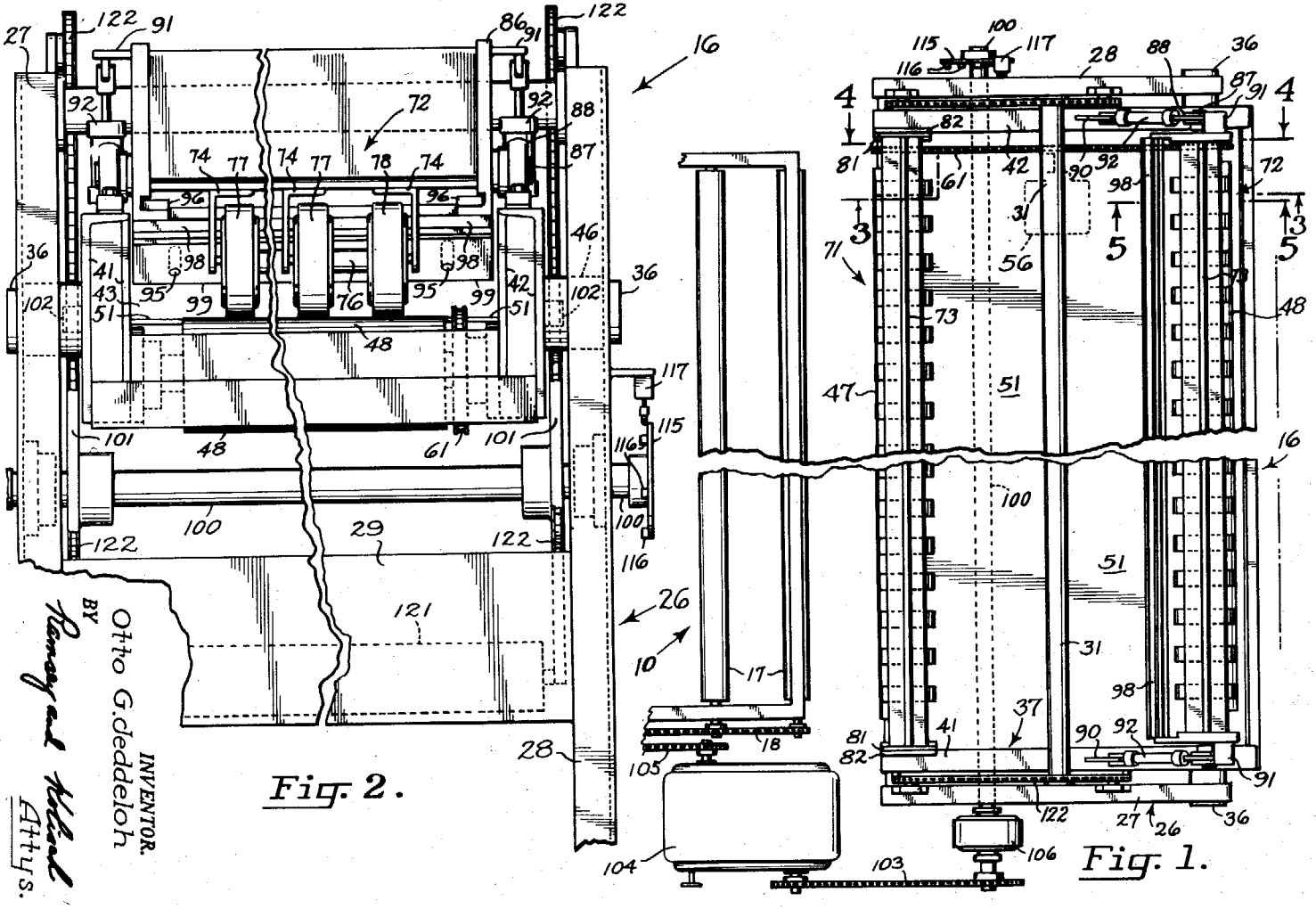
Fig. 1 is a top plan view illustrating the loading conveyor mechanism of this invention and portions of a multideck receiving conveyor assembly.
Fig. 2 is part of an end elevation, slightly enlarged, of the loading conveyor mechanism of Fig. 1, viewing the infeed end.
Figure 4:
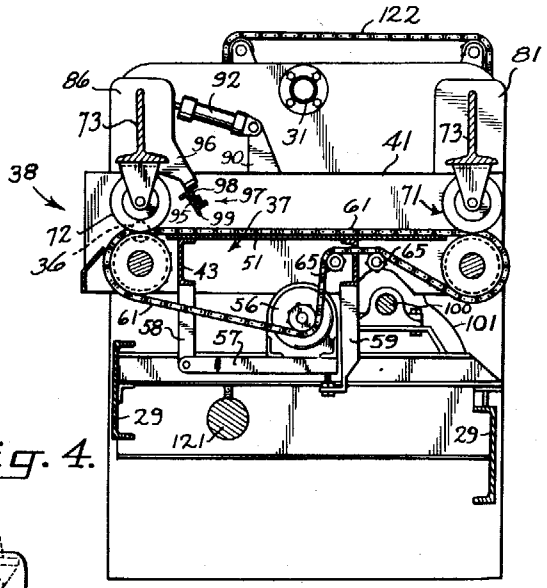
Fig. 4 is a section view along the line 4—4 of Fig. 1.
Figure 3:
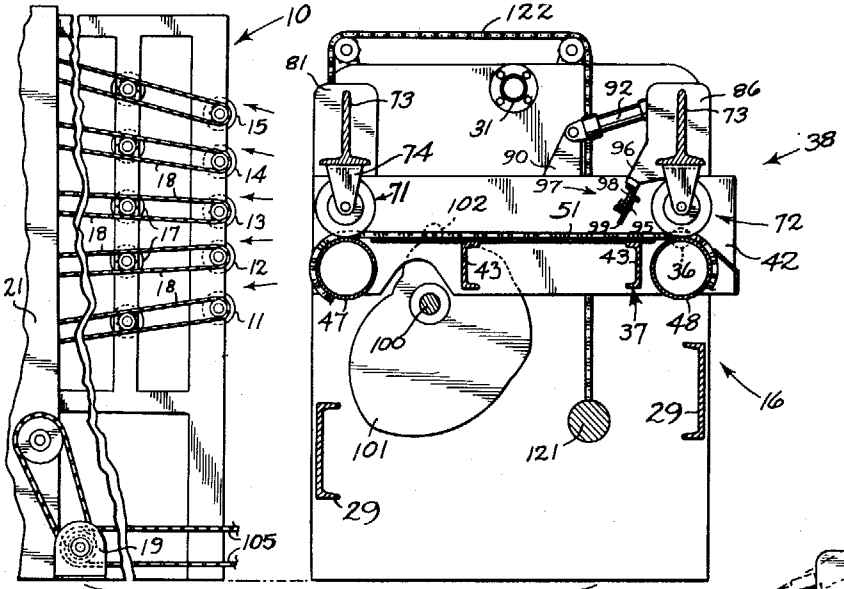
Fig. 3 is a section view along the line 3—3 of Fig. 1.

Referring now to the drawings for a description of a particular embodiment of the invention, and in particular to Figs. 1 and 3, illustrated in the drawings is a sheet handling mechanism comprising a multideck conveyor assembly 10 having plural conveyor sections 11 through 15 stacked one over another, and a sheet loading mechanism indicated generally at 16 adjacent the infeed ends of the conveyor sections. Conveyor sections 11 through 15 of the multideck assembly are conventional, and may include a series of rolls such as rolls 17 geared together for simultaneous rotation by connecting chains 18. Chains 18 and the rolls of each conveyor section are driven simultaneously by a motor 19 connected to the chains 18 through a conventional gear box 21.

The conveyor sections of the multideck conveyor assembly 10 transport veneer pieces in stacked layers through a drier (not illustrated). Loading mechanism 16 at the infeed end of the conveyor sections 11—15 is utilized fully to load each of the decks of the multideck assembly thereby to obtain maximum use of the drier.

With reference now in particular to Figs. 1, 2, 3, and 4, loading mechanism 16 comprises a main frame 26 made up of opposed side structures 27, 28. Side structures 27, 28 are braced together and rigidized by cross beams 29, and a brace bar 31 interposed between the tops of the side structures. Pivoted intermediate side structure 27, 28 on pivot connections 36 is a subframe 37 of a loading conveyor mechanism 38.

Subframe 37 comprises a pair of opposed elongated beams 41, 42. These are connected together by transversely extending channel beams 43. The subframe is pivoted to main frame 26 by pivot connections 36 connecting the beams 41, 42 of the subframe to side structures 27, 28. Spacers 46 interposed between the side structures and beams 41, 42 maintain the subframe centrally between the side structures.

Rotatably mounted at either end of the subframe are a pair of smooth surfaced, steel rolls 47, 48. These rolls are power driven, and supply the motion for transporting veneer through the loading conveyor. Intermediate the rolls is a flat plate or table 51 secured to channel beams 43 and thereby integral with the subframe. Rolls 47, 48 are spaced apart a distance substantially less than the length of the veneer sheets handled (see Fig. 7), so that veneer on traveling through the loading conveyor mechanism always contacts a rotating roll 47, 48. Plate 51 merely guides the veneer, in the event that it is deformed, from one roll to the next.

Rolls 47, 48 are driven by a motor 56 carried by the pivoted subframe 37. The motor is shown mounted on a support platform 57 connected by members 58, 59 to the lower portions of channel beams 43. Drive is transmitted from motor 56 to the rolls by a chain 61 reeved about a sprocket provided at one end of each of the rolls and a pair of idler sprockets 65. During operation of the apparatus, motor 56 runs constantly, and thus constantly rotates rolls 47, 48.

Also a part of the loading conveyor mechanism 38 is a pair of elongated roll mechanisms 71, 72. These are mounted at the outfeed and infeed ends of the subframe and positioned above rolls 47, 48, respectively.

The roll mechanisms are similar. Each of the roll mechanisms 71, 72 comprises a transverse T-beam 73 having affixed thereto along its bottom flange plural bracket mounts 74. The bracket mounts are arranged in pairs, with cooperating pairs mounting a short roll shaft 76. Interposed between cooperating brackets and rotatably carried on the roll shaft thereinbetween are a pair of wheels 77, 78. These wheels are provided with pneumatic tires (or solid tires of relatively resilient material) which are engaged and rotated by rolls 47 or 48. Thus each clamping roll mechanism is provided along its length with plural clamping surface portions, each of which is yieldable radially of the rotation axis for the roll mechanism independently of adjacent clamping surface portions.

The forward clamping roll mechanism 71 is held in fixed position over roll 47 by plates 81 secured to the T-beam for the roll and fastened to gussets 82 which are affixed in a suitable manner as by welding to elongated beams 41, 42 of the subframe. Unlike the forward clamping roll mechanism which is fixed, the rear roll mechanism 72 is pivotable toward and away from steel roll 48 therebelow.

Specifically, T-beam 73 of the rear roll mechanism is secured at each of its ends to a mounting plate 86. Affixed to each of the mounting plates and projecting laterally outwardly therefrom (see Fig. 2) is a stud portion 87. These stud portions are rotatably mounted in bushings 88 secured to beams 41, 42 of the subframe. The bushings and studs accommodate pivotal movement of roll mechanism 72 relative to the subframe 37 as shown by the solid and dashed outline of the roll mechanism in Fig. 5.

Figure 5:
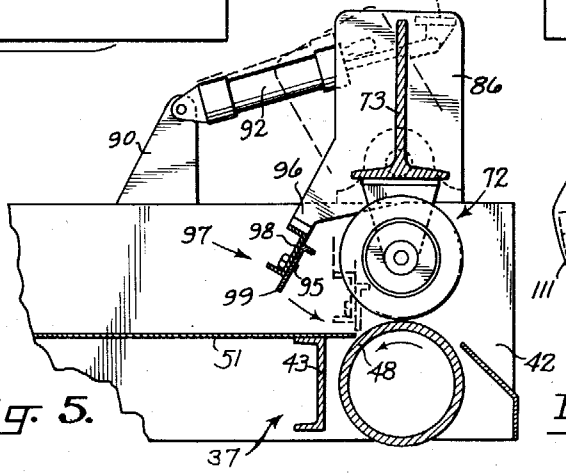
Fig. 5 is a view, slightly enlarged, of clamping and fence mechanism employed at the infeed end of the loading conveyor.

A power or motor means is provided for pivoting roll mechanism 72. The power means takes the form of a pair of piston-cylinders 92. Referring to Figs. 1, 3, and 5, each of these is pivoted at one end to an ear 90 secured to the subframe and at its other end to an ear 91 secured to one of the mounting plates 86. On expansion of the piston-cylinders the front roll mechanism swings in a clockwise direction in Fig. 3 down towards roll 48, and on retraction of the piston-cylinders the roll mechanism swings in the opposite direction.

Carried on projecting portions 96 of each of the mounting plates 86 is a fence mechanism 97. This comprises a fence bar 98 rigidly secured to portions 96 and a follower bar 99 slidably mounted on bar 98 by means of pin and slot connections 95 (see Fig. 2). The pin portions of the connections are secured to bar 99, and the slots are formed in bar 98. When the fence is moved downwardly over steel roll 48 as shown by the dotted lines in Fig. 5, the fence bar 98 clears table 51 and roll 48, and veneer can pass underneath bar 98. When follower bar 99 drops down, however, to a position directly over table surface 51, the follower bar acts to shut off the infeed end of the loading conveyor. The fence mechanism, as it is carried by plates 86, moves conjointly with roll mechanism 72.

Mechanism is provided for moving the free or nonpivoted end of the loading conveyor mechanism into registry with the infeed ends of each of the conveyor sections of the multideck conveyor assembly. Specifically, extending between side structures 27, 28 of the main frame is a cam shaft 100. The cam shaft is rotatable in structure 27, 28, and has affixed to each of its ends a cam or positioning member 101. The cam member rotates with the cam shaft in the spaces provided between the side structures of the main frame and opposite sides of subframe 37, as can be seen in Fig. 2. The cam edge of each cam member which extends around the periphery thereof engages a runner member 102 secured to the subframe and projecting outwardly therefrom.

The cam shaft and cam members are rotated at a speed related to the speed of the conveyor sections of the multideck conveyor assembly. Chains 103, 105, a conventional variable speed gear box 104, and a gear box 106 connect motor 19 and cam shaft 100. Up and down movement of the free or nonpivoted end of the loading conveyor mechanism is timed so that the outfeed end of the loading conveyor moves into registry with a conveyor section of assembly 10 when the conveyor of that conveyor section has moved sufficiently to accommodate an additional charge of veneer.

Figure 6:
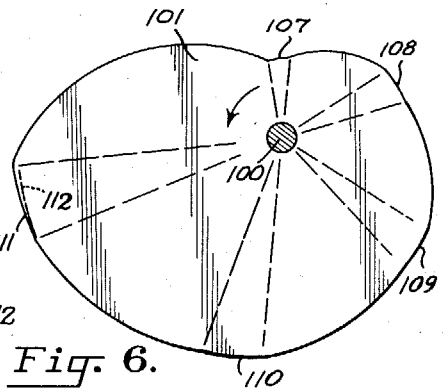
Fig. 6 is an enlarged view of one of the cam elements or members lifting the free end of the loading conveyor.

The cam surface of each cam member defines a series of step portions, which are indicated in Fig. 6 at 107, 108, 109, 110, and 111. These correspond in number to the number of conveyor sections in the multideck receiving conveyor assembly 10. Each of the step portions has a curved outline which recedes from the rotation axis of the cam extending in the direction of a runner member 102 takes while riding over the step portion. This is best illustrated in Fig. 6 by step portion 111, wherein the dotted line 112 is arced about a radius coinciding with the rotation axis of the cam. The step portions support the loading conveyor mechanism during the charging period of the apparatus, i.e., during the time veneer is fed into assembly 10. In the embodiment illustrated charging of assembly 10 takes place during about 15° rotation of the cams, and alignment with a suceeding conveyor section takes place during about 50° rotation of the cams. Alignment is produced by the surface portions of the cams interposed between the step portions. The receding outlines of the cam step portions mean that the free end of the loading conveyor is not held stationary during charging of assembly 10. Instead, this free end of the loading conveyor is constantly rising. The absence of any dwell in the conveyor during charging is important, as it prevents slackening of tension in chains 103, 105 and the occurrence of any backlash which would cause erratic action in the cam.

Connected to one end of the cam shaft is a rotatable disc 115 (see Figs 1 and 2) having five finger elements 116 mounted thereon, the number of finger elements corresponding to the number of conveyor decks in the receiving conveyor assembly 10. These finger elements are positioned to actuate a switch 117 as the finger elements rotate with the cam shaft. Switch 117 energizes a conventional solenoid valve regulating the supply of pressure fluid to piston-cylinders 92. The switch is closed by a finger to cause rear roll mechanism 72 to swing downwardly against roll 48 at the start of a charging cycle, which is simultaneous with the loading conveyor coming into registry of a conveyor section of assembly 10. The switch opens a short time later, to cause roll mechanism 72 to swing away from roll 48 and fence mechanism 97 to swing down. Opening of the switch occurs after veneer reaches roll 47 but before the tail ends of the veneer sheets pass the fence mechanism. The follower bar of the fence mechanism yieldably slides over the top faces of the veneer until the ends move forwardly of the bar and it can drop down.

Counterweight 121 supported on chains 122 attached to the forward end of the loading conveyor compensates partially for the weight of the loading conveyor and relieves the cams from supporting the full weight of the conveyor.

Figure 7:
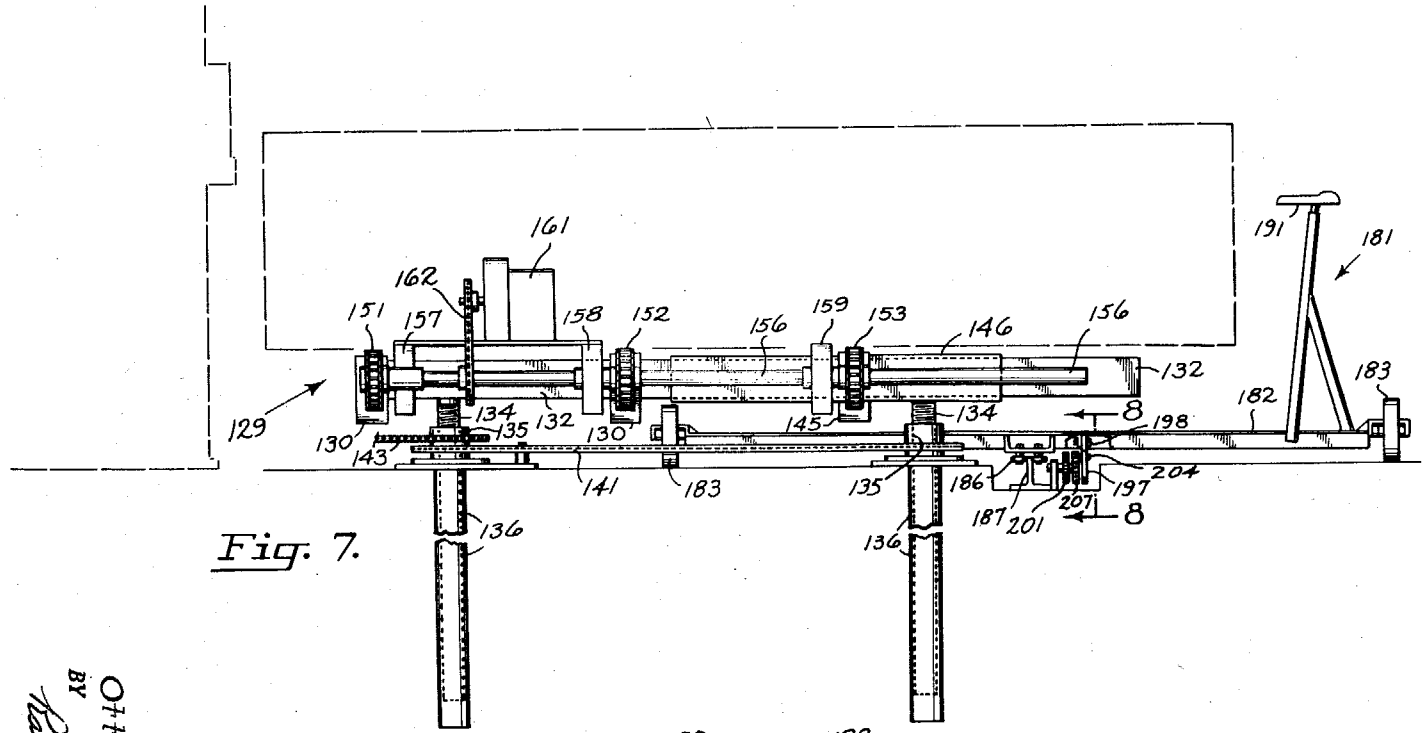
Fig. 7 is a side elevation of an elevatable platform and carriage provided at the infeed side of the loading conveyor.
Figure 9:
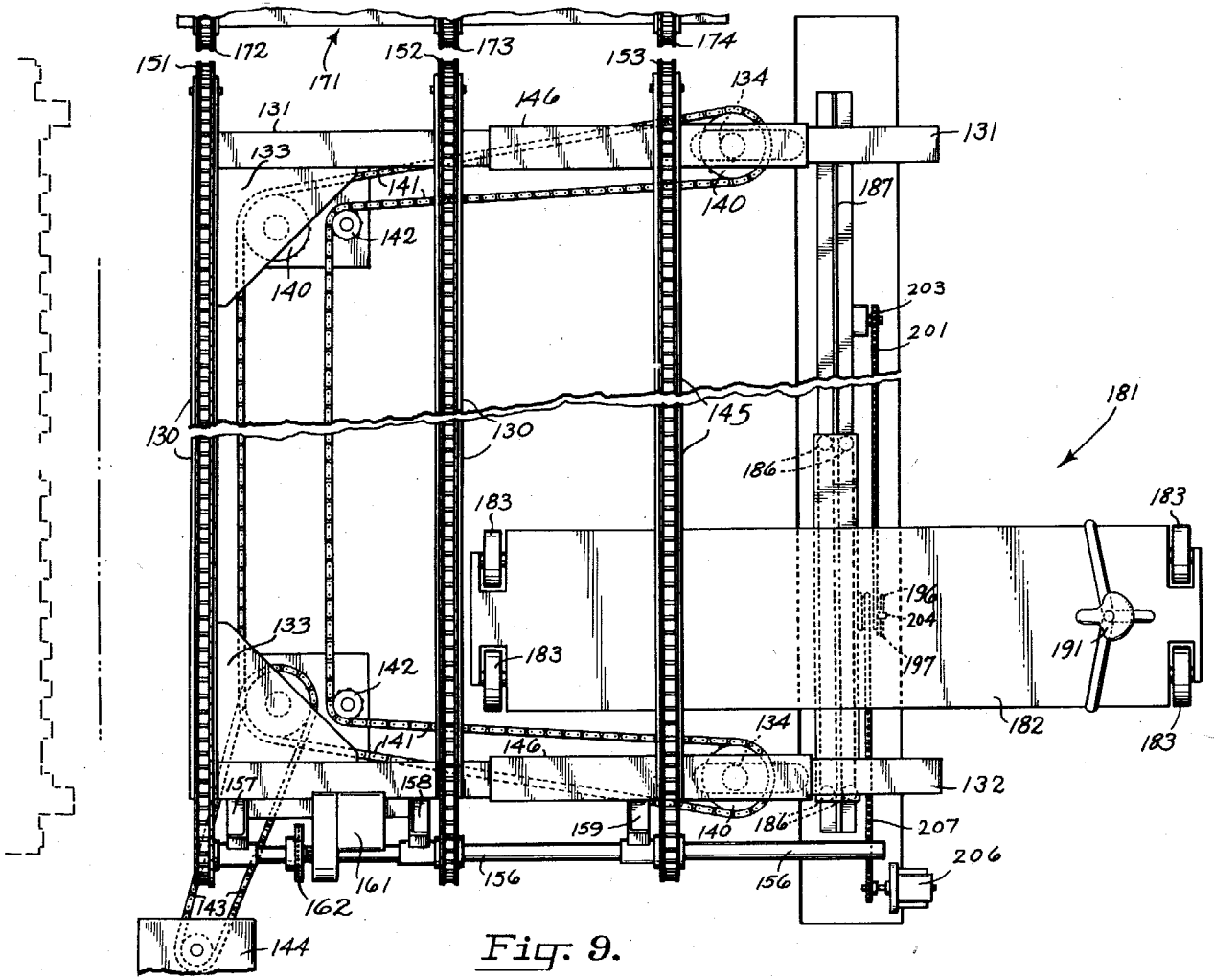
Fig. 9 is a top plan view of the elevatable platform of Fig. 7, with the stack of veneer shown in Fig. 7 moved therefrom.

At the infeed end of the loading conveyor there is provided an elevatable platform structure generally indicated at 129, and best illustrated in Figs. 7 and 9. The platform structure comprises spaced support beams 131, 132, transverse beams 130, and gussets 133, and is supported on hoist screws 134. The hoist screws are threaded into and extend through internally threaded portions 135 rotatably mounted on the floor. The hoist screws project through these internal threaded portions into wells 136 beneath the platform mechanism. The hoist screws are rotated simultaneously to raise all sides of the platform by gears 140 integral with portion 135. Driving the gears is a chain 141 reeved about the gears and idler gears 142. Motor 144 and chain 143 supply the power to raise and lower the platform structure.

The platform is extensible to enable handling of varying lengths of veneer. Specifically, sleeve portions 146 envelop and slide on support beams 131, 132. Each of the sleeve portions has a slot 147 formed therein to accommodate the hoist screw passing therethrough to the beam mounting the sleeve portion. A transverse beam 145 interconnects sleeves 146. The rearmost pair of hoist screws 134 may support beams 131, 132 to the rear of beam 145 as shown or in some designs it may be best to mount them forwardly of beam 145.

Stacks of veneer are moved onto the platform structure along a path extending transversely of the path of the veneer in traveling through the loading conveyor. Moving the veneer and supporting the same while positioned on the platform structure are a series of conveyor chains 151, 152, and 153. The chains travel over beams 130, 145. The upper portion of chains 151, 152 in Fig. 9 are reeved about sprockets rotatably mounted on the ends of beams 130, and the upper portion of chain 153 in Fig. 9 is reeved about a sprocket secured to the end of beam 145. The other ends of chains 151, 152, 153 engage sprockets nonrotatably secured to a drive shaft 156 driven by motor 161 and chain 162. The sprocket mounting the lower end of chain 153 in Fig. 9 may be loosened from shaft 156 and adjusted in position along the length of the shaft on expansion or contraction of the platform structure. Shaft 156 is rotatably supported by brackets 157, 158, and 159 secured to beam 132 and sleeve 146.

A storage platform indicated at 171 in Fig. 9 and comprising chains 172, 173, and 174 is also provided for storage of a stack of veneer prior to removal of the stack onto elevatable platform structure 129.

Rearwardly of the elevatable platform is an operator's carriage mechanism 181. This comprises a frame 182 supported at its ends on wheels 183. Rotatably secured to opposite sides of frame 181 and running along an upwardly projecting flange of a T-beam 187 which is mounted on the floor are a series of rollers 186. The rollers in conjunction with the T-beam 187 guide the carriage in transverse movement from side to side underneath a stack of veneer carried on platform means 129.

At one end of the carriage is an operator's seat 191. Conventionally adjustable mechanism interposed between seat 191 and frame 182 accommodate adjustment in the height of seat 191.

Figure 8:
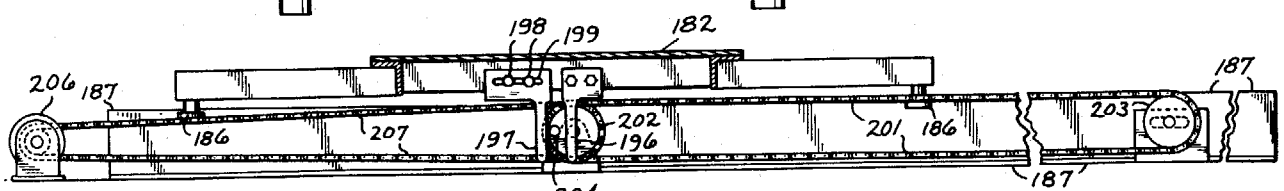
Fig. 8 is a section view along the line 8—8 in Fig. 7.

The operator's carriage is moved back and forth between side limit positions on either side of a stack of veneer carried on platform 129 by mechanism best illustrated in Figs. 8 and 9. Referring to these figures, secured to the underside of carriage frame 182 are a pair of depending fingers 196 and 197. These are spaced apart a small distance. The spacing between the fingers may be changed by adjusting the position of finger 197, which is secured to frame 182 by nut and bolt assembly 198 extending through slot 199 formed in an upper mounting portion of finger 197.

Lying transversely of elevatable platform 129 and beneath the platform is an elongated continuous chain 201 reeved about anchoring sprockets 202 and 203. Chain 201 has affixed thereto a lug 204 which projects laterally to one side of the chain and is fitted intermediate fingers 196, 197 secured to the carriage. Movement of the chain about sprockets 202, 203 produces movement of the lug from one side of the platform to the other. The lug in moving the carriage from left to right in Fig. 8 contacts finger 196, and in moving the carriage from right to left in Fig. 8 contacts finger 197. The spacing between the fingers introduces a lost motion which produces a delay in the travel of the carriage when the carriage reaches one of its side limit positions.

Variable speed motor 206 and chain 207 rotate the shaft supporting sprocket 202 and thus provide the power moving the carriage. Motor 206 is run continuously. In operation of the carriage, the speed of motor 206 and the spacing between the fingers 196 and 197 is adjusted so that the carriage completes one pass from one side of a stack of veneer to the other during the loading cycle of the loading conveyor mechanism which is after follower bar 99 has dropped down over the tail ends of veneer pieces, and during the time that a cam edge portion of each cam intermediate a pair of step portions is moving the loading conveyor from one conveyor section of assembly 10 into registry with the next conveyor section. When registry with the next conveyor section is reached, the charging cycle for assembly 10 starts, and fence mechanism 97 swings up and roll mechanism 72 swings down to start movement of veneer through the loading conveyor to charge assembly 10. During this charging interval the carriage remains stationary at one side of the veneer stack. The carriage starts movement again on completion of the charging cycle and the start of the next loading cycle.

As used herein, the term "stack" has referred to the load of veneer supported on the platform structure for feeding to the loading conveyor. The stack of veneer in most instances usually will not constitute one single bundle of veneer, but instead will comprise plural bundles arranged side by side and extending between the lateral side limits of the loading conveyor and drier. These in the usual instance are quite wide, and are capable of handling a considerable number of sheets placed one beside the other. The carriage is particularly important in connection with relatively wide installations.

Motor 206 could be eliminated and by suitable chain and gear connections motor 19 of the conveyor sections could be made to drive carriage 181 in time with the operation of the conveyors, and thus up and down movement of the loading conveyor.

It should be apparent that the feeding apparatus of this invention has a number of novel features. Movement of the free or nonpivoted end of the loading conveyor mechanism up and down is produced by a constantly energized motor, which is the motor driving the conveyor sections of the multideck conveyor assembly 10. While this motor is running constantly, the power of the motor is converted by means of the novel cams hereinabove described to up and down movement of the loading conveyor mechanism at two different speed rates. Movement of the loading conveyor vertically is relatively slow during charging of assembly 10 and considerably faster during the time that the conveyor is moving into registry with the next section of assembly 10.

A relatively short loading conveyor is employed having length substantially less than the length of the veneer sheet. Positive clamping means at each end of the mechanism are operable to grab opposite faces of a sheet deposited on the loading conveyor mechanism. The infeed end of the loading conveyor mechanism is stationary, eliminating the need for hoist mechanism at this point of the apparatus. This infeed end is spaced at an elevation approximately centrally between the elevation of the infeed ends of the lower and uppermost sections of multideck conveyor assembly 10.

The fence mechanism and roll mechanism 72 regulating the passage of veneer through the loading conveyor are controlled by pins 116 which are rotatable with the cam shaft and cams, and independently of any trip or other mechanism actuated by feeding veneer to the loading conveyor. The fence follower bar moves down to shut off the feed of new sheets instantly with the passage of already loaded sheets through the infeed end of the loading conveyor. The maximum time allowed for loading the loading conveyor mechanism enables an operator easily to load conveyor mechanism 38 between charging cycles.

Bottom roll 48 provides a support for new sheets fed to conveyor 38 during the loading cycle. The roll is smooth, and without the assist of clamping roll 72, operates only gently to urge new sheets fed to the conveyor against the downwardly positioned fence mechanism. The latter mechanism at this time functions as an indexing means.

The individually mounted rolls of the forward and rear clamping roll mechanisms 71, 72 are important for assuring a positive grab of veneer sheets of varied thicknesses. As mentioned above, several sheets usually travel side by side through the apparatus, and these sheets as a practical matter do not all have identical thicknesses. A single, elongated roll would tend to grab some sheets more firmly than others, whereas the individual rolls of this invention grab all sheets passing thereunder with substantially the same degree of force.

With the infeed end of the loading conveyor mechanism stationary, an elevatable platform is employed for raising periodically the stack of veneer which is being fed to the loading conveyor. This platform is only used to compensate for diminution in the height of the stack occurring by reason of the removal of veneer from the stack. Adjustment of the platform in height is necessary only at relatively infrequent intervals.

While there has been described an embodiment of the invention, it is appreciated that variations and modifications may be made in the parts and their arrangements. It is intended not to be limited to the specific embodiment inclosed, but to cover all modifications and variations which would be apparent to one skilled in the art and that come within the scope of the appended claims.

It is claimed and desired to secure as Letters Patent:

1. In sheet handling mechanism for handling sheets of predetermined length, a multiple deck receiving conveyor assembly having plural conveyor sections stacked one over another, a [pivotal] loading conveyor mechanism aligned longitudinally with said receiving conveyor assembly [and] *for* transporting sheets in a path toward said receiving conveyor assembly, said loading conveyor mechanism having a length substantially less than the length of said sheets and a pair of clamp means, one at each end of the loading conveyor mechanism, each having opposed clamp portions *for* clamping against opposite faces of a sheet *at least one of said clamping portions of each clamp means being rotatable and power driven whereby each clamp means is operable to move a sheet independently of the other,* a frame pivotally mounting the infeed end of said loading conveyor mechanism with the outfeed end thereof swinging up and down in a path past registering positions with the infeed ends of said stacked conveyor sections, said infeed end of said loading conveyor mechanism [swinging about] *having* a fixed pivot axis spaced at an elevation substantially centrally of the elevation of the upper and lowermost conveyor sections of said multiple deck receiving conveyor assembly *and extending substantially between the opposed clamping portions at the infeed end,* elevatable platform means adjacent the infeed end of said loading conveyor mechanism supporting stacked sheets to be fed to said loading conveyor mechanism, a cam member mounted on said frame rotatable about an axis extending transversely of the path of sheets transported by said loading conveyor mechanism and having a cam edge engaging a portion of said loading conveyor mechanism spaced from its infeed end, said cam edge having plural step portions radially offset at unequal distances from the rotation axis of said cam member and corresponding in number to at least the number of conveyor sections of said multiple deck receiving conveyor assembly, each of said step portions having an outline which gradually recedes from the rotation axis of said cam member, said step portions being separated by sharply receding cam edge portions, and power actuated drive means rotating said cam member and driving the conveyor sections of said receiving conveyor assembly conjointly and at related speeds.

[2. The sheet handling mechanism of claim 1 wherein the clamp means at the infeed end of said loading conveyor mechanism comprises opposed roll mechanisms movable relatively of each other toward and away from each other, and which further comprises motor means moving said roll mechanisms toward and away from each other, and means rotatable with said cam member actuating at intervals said last-mentioned motor means.]

3. For a multideck receiving conveyor assembly having plural conveyor sections stacked one over the other, aligning and feed means for feeding sheets of predetermined length to said conveyor sections, said means comprising a loading conveyor mechanism mounted adjacent said stacked conveyor sections *for* transporting sheets in a path defined by the loading conveyor mechanism toward said receiving conveyor assembly and with the outfeed end thereof adjacent the infeed ends of said conveyor sections, means driving said loading conveyor mechanism at a predetermined rate of speed, and hoist means *for* raising and lowering said outfeed end of said loading conveyor mechanism past registering positions with the infeed ends of said stacked conveyor sections, said loading conveyor mechanism having a length substantially less than the length of said sheets, opposed clamping means at the infeed end [thereof] *and outfeed ends, the opposed clamping means at the infeed end being relatively* movable toward and away from each other, power means *for* moving said clamping means *at the infeed toward and away from each other,* a fence having a yieldable follower mounted adjacent said clamping means *at the infeed end* with the follower projecting toward the path defined by said loading conveyor mechanism, means moving said fence toward said path when said clamping means *at the infeed end* move away from each other and away from said path when [said] *the* clamping means move toward each other, and control means connected to and regulating said power means, said control means actuating said power means in timed relation with movement of said hoist means, said control means actuating said power means first to move said clamping means *at the infeed end* toward each other, and then to move said clamping means *at the infeed end* away from each other after a time interval less than that required for said loading conveyor mechanism to move a sheet past said clamping means *at the infeed end but sufficient for the conveyor mechanism to move a sheet into the clamping means at the outfeed end.*

4. In sheet handling mechanism for handling sheets of predetermined length, a multiple deck receiving conveyor assembly having plural conveyor sections stacked one over another, a [pivoted] loading conveyor mechanism aligned longitudinally with said receiving conveyor assembly [and] *for* transporting sheets in a path defined by said loading conveyor mechanism toward said assembly, a frame pivotally mounting the infeed end of said loading conveyor mechanism with the outfeed end thereof swinging up and down past registering positions with the infeed ends of said stacked conveyor sections, said infeed end of said loading conveyor mechanism [swinging about] *having* a fixed pivot axis spaced at an elevation substantially centrally of the elevation of the upper and lowermost conveyor sections of said receiving conveyor assembly *and disposed at substantially the location where sheets enter the loading conveyor mechanism,* means driving said loading conveyor mechanism at a predetermined rate of speed, and hoist means *for* raising and lowering the outfeed end of said loading conveyor mechanism, said loading conveyor mechanism having a length substantially less than the length of the sheets handled, opposed clamping means at the infeed *and outfeed ends* [end] thereof the opposed clamping means at the infeed end being movable toward and away from each other, power means *for* moving said clamping means *at the infeed end,* a fence having a yieldable follower mounted at the infeed end of said loading conveyor mechanism with the follower projecting toward the path defined by said loading conveyor mechanism, means moving said fence toward said path when said clamping means *at the infeed end* move away from each other and away from said path when [said] *the* clamping means move toward each other, and control means connected to and regulating said power means, said control means actuating said power means in timed relation with movement of said hoist means, said control means actuating said power means first to move said clamping means *at the infeed end* toward each other, and then to move said clamping means *at the infeed end* away from each other after a time interval less than that required for said loading conveyor mechanism to move a sheet past said clamping means *at the infeed end but sufficient for the conveyor mechanism to move a sheet into the clamping means at the outfeed end.*

[5. In sheet handling mechanism for handling sheets of predetermined length, said mechanism having a multideck receiving conveyor assembly with plural conveyor sections stacked one over the other, feeding means for said receiving conveyor assembly comprising a frame, a loading conveyor mechanism pivoted at its infeed end on said frame and with its outfeed end adjacent the infeed ends of said conveyor sections, and means for swinging the free end of said loading conveyor mechanism up and down with the outfeed end thereof moving into registry with the infeed ends of said conveyor sections, said loading conveyor mechanism having at both its infeed and outfeed ends a smooth bottom roll, said bottom rolls defining a sheet transfer path and being spaced apart a distance less than the length of said sheets, drive means driving each of said bottom rolls, an elongated clamping roll mechanism radially spaced above each of said bottom rolls, power means for moving the clamping roll mechanism at the infeed end of said loading conveyor mechanism toward and away from its associated bottom roll, a fence mechanism, and means connecting said fence mechanism to said clamping roll mechanism at the infeed end of said loading conveyor mechanism whereby the former moves toward said transfer path on movement of the clamping roll mechanism away from said path and away from said path on movement of the clamping roll mechanism toward said path, said fence mechanism having a yieldable follower projecting outwardly from its base toward said path, each of said clamping roll mechanisms having plural clamping surface portions each of which is yieldable radially of the roll mechanism independently of adjacent clamping surface portions.]

[6. In sheet handling mechanism for handling sheets of predetermined length, said mechanism having a multideck receiving conveyor assembly with plural conveyor sections stacked one over the other, feeding means for said assembly comprising a frame, loading conveyor mechanism aligned longitudinally with said receiving conveyor assembly, and means pivotally connecting said loading conveyor mechanism to said frame for pivotal movement of the mechanism about a fixed pivot axis, said loading conveyor mechanism having a length substantially less than the length of said sheets, said loading conveyor mechanism comprising a pair of spaced smooth surfaced bottom rolls defining a transfer path through the mechanism and located at the infeed and outfeed ends of a conveyor mechanism, respectively, means driving said bottom rolls, an elongated clamping roll mechanism radially spaced above each of said bottom rolls, power means for moving the clamping roll mechanism at the infeed end of said loading conveyor mechanism toward and away from said transfer path, a fence mechanism, and means connecting said fence mechanism to the clamping roll mechanism at the infeed end of the loading conveyor mechanism whereby the clamping load mechanism moves toward said transfer path on movement of said fence mechanism away from said transfer path and away from said transfer path on movement of said fence mechanism toward said transfer path, said fence mechanism having a yieldable follower projecting outwardly from its base toward said transfer path, each of said clamping roll mechanisms having plural clamping surface portions each of which is yieldable radially of the roll mechanism independently of adjacent clamping surface portions.]

7. In sheet handling mechanism having a multideck receiving conveyor assembly with plural conveyor sections stacked one over the other, a power driven loading conveyor mechanism moving sheets in a path toward said receiving conveyor assembly and having an outfeed end adjacent said assembly, said outfeed end being movable up and down and into registry with the infeed ends of the conveyor sections of said receiving conveyor assembly, power means moving said outfeed end of said loading conveyor mechanism up and down, platform means at the infeed end of said loading conveyor mechanism supporting stacked sheets to be fed to said loading conveyor mechanism, an operator's support station rearwardly of said platform means, means mounting said support station for movement of the latter transversely of the path of sheets through said loading conveyor mechanism and between limit positions spaced on either side of said platform means, and power actuated means moving said support station to and fro between said limit positions, said power actuated means moving said support station in one pass between said limit positions, after said outfeed end of said loading conveyor mechanism moves into registry with one of said conveyor sections and before said outfeed moves into registry with a subsequent conveyor section.

8. The sheet handling mechanism of claim 7 wherein said power actuated means comprises a continuously operating driving motor having a rotary power output shaft, and power transmitting means connecting said output shaft to said support station whereby rotary movement of said output shaft is converted to reciprocating movement of said support station between said limit positions, said power transmitting means including a lost motion connection producing an interruption in the movement of said station when the station reaches a limit position.

*9. In sheet handling mechanism for handling sheets of a predetermined length, a multiple deck receiving conveyor assembly having a plural conveyor sections stacked one over another, loading conveyor mechanism aligned longitudinally with said receiving conveyor assembly for transporting sheets in a path toward said receiving conveyor assembly, said loading conveyor mechanism having a length substantially less than the length of the sheets and a pair of clamp means, one at each end of the loading conveyor mechanism, each having opposed clamping portions for clamping against opposite faces of a sheet, the clamp means at the infeed end of the loading conveyor mechanism comprising opposed roll mechanisms movable relatively of each other toward and away from each other, a frame pivotally mounting the infeed end of said loading conveyor mechanism with the outfeed end thereof swinging up and down in a path past registering positions with the infeed ends of said conveyor sections, said infeed end of said loading conveyor mechanism swinging about a fixed pivot axis spaced at an elevation substantially centrally of the elevation of the upper and lowermost conveyor sections of said multiple deck receiving conveyor assembly, elevatable platform means adjacent the infeed end of said loading conveyor mechanism for supporting stacked sheets to be fed to said loading conveyor mechanism, a cam member mounted on said frame rotatable about an axis extending transversely of the path of sheets transported by said loading conveyor mechanism and having a cam edge engaging a portion of said loading conveyor mechanism spaced from its infeed end, said cam edge having plural step portions radially offset at unequal distances from the rotation axis of the cam member and corresponding in number to at least the number of conveyor sections of said multiple deck receiving conveyor assembly, each of said step portions having an outline which gradually recedes from the rotation axis of said cam member, said step portions being separated by sharply receding cam edge portions, power actuated drive means rotating said cam member and driving the conveyor sections of said receiving conveyor assembly conjointly and at related speeds, motor means for moving said opposed roll mechanisms of the clamp means at the infeed end toward and away from each other, and means rotatable with said cam member actuating at intervals said last-mentioned motor means.*

*10. For a multideck receiving conveyor assembly having plural conveyor sections stacked one over the other, aligning and feed means for feeding sheets of predetermined length to said conveyor sections, said means comprising a pivoted loading conveyor mechanism aligned longitudinally with said receiving conveyor assembly for transporting sheets in a path defined by the loading conveyor mechanism and having an outfeed end adjacent the infeed ends of said conveyor sections, and hoist means for raising and lowering said outfeed end past registering positions with the infeed ends of said stacked conveyor sections, said loading conveyor mechanism having opposed power rotated clamping roll mechanisms at its infeed and outfeed ends spaced apart a distance less than the length of the sheets, the opposed clamping roll mechanisms at the infeed end being relatively movable toward and away from each other, power means for moving the relatively movable clamping roll mechanisms at the infeed end toward and away from each other, a fence having a follower mounted adjacent the relatively movable clamping roll mechanisms with the follower projecting toward the path defined by the loading conveyor mechanism, means for moving said fence toward said path*

*when said relatively movable clamping roll mechanisms move away from each other and away from said path when the relatively movable clamping roll mechanisms move toward each other, and control means connected to and regulating said power means, said control means actuating said power means in timed relation with movement of said hoist means, said control means actuating said power means first to move said relatively movable clamping roll mechanisms toward each other and then to move the clamping roll mechanisms away from each other after a time interval less than that required for the loading conveyor mechanism to move a sheet past said relatively movable clamping roll mechanisms but sufficient for the conveyor mechanism to move a sheet into the opposed roll mechanisms at the outfeed end of the loading conveyor mechanism.*

*11. In sheet handling mechanism for handling sheets of predetermined length, said mechanism having a multideck receiving conveyor assembly with plural conveyor sections stacked one over the other, feeding means for the assembly comprising a loading conveyor frame having an infeed end and opposite the infeed end an outfeed end disposed adjacent the infeed ends of said conveyor sections, two sets of paired and opposed roll mechanisms mounted on said conveyor frame, each comprising a bottom roll mechanism and a top roll mechanism mounted in clamping relation over the bottom roll mechanism, one set adjacent said outfeed end of said frame and one set adjacent the infeed end of said frame, said roll mechanisms being substantially parallel to each other and extending transversely of said frame, the set of roll mechanisms at the outfeed end of the frame being spaced from the set at the infeed end a distance substantially less than the length of a sheet, power-actuated means for driving at least one roll mechanism of each of said sets, means for moving one of the roll mechanisms of the set adjacent the infeed end away from the other roll mechanism of the same set and for returning the said one roll mechanism into clamping relation with said other roll mechanism whereby sheet ends may be inserted between the two roll mechanisms, a supporting frame, and pivot means pivotally mounting said infeed end of the conveyor frame on said supporting frame and accommodating swinging of the conveyor frame and with the frame the plane that extends tangentially through the nip of the pair of roll mechanisms at the infeed end of the conveyor frame, whereby the feed direction of said roll mechanisms at the infeed end may be swung toward different ones of said conveyor sections, said pivot means pivotally mounting said conveyor frame for pivotal movement about an axis that is substantially parallel to the roll mechanisms and disposed substantially at the location where sheets enter between the roll mechanisms at said infeed end.*

*12. In sheet handling mechanism for handling sheets of predetermined length, said mechanism having a multideck receiving conveyor assembly with plural conveyor sections stacked one over the other, feeding means for said assembly comprising a loading conveyor frame having an infeed end and an outfeed end opposite the infeed end disposed adjacent the infeed ends of said conveyor sections, an upper and a lower roll mechanism disposed in clamping relation with respect to each other and mounted at the infeed end of said conveyor frame and an upper and a lower roll mechanism disposed in clamping relation with respect to each other and mounted at the outfeed end of said conveyor frame, the roll mechanisms being substantially parallel to each other and extending transversely of the conveyor frame, the pair of roll mechanisms at the infeed end and the pair of roll mechanisms at the outfeed end of the conveyor frame being spaced from each other a distance substantially less than the length of a sheet, power-actuated means for driving the lower roll mechanism of each pair of roll mechanisms, means for moving the upper roll mechanism of the pair at the infeed end of the loading conveyor frame away from the lower roll mechanism of said pair and then for returning the upper roll mechanism to accommodate the insertion of sheet ends between the roll mechanisms, each of the upper roll mechanisms having plural clamping surface portions each of which is yieldable radially of the roll mechanism and independently of adjacent clamping surface portions, a supporting frame, and pivot means pivotally mounting the infeed end of said conveyor frame on said supporting frame and accommodating swinging of the conveyor frame and with the frame the plane that extends tangentially through the nip of the pair of roll mechanisms at the infeed end of the conveyor frame, whereby the feed direction of said roll mechanisms at said infeed end may be swung toward different ones of said conveyor sections, said pivot means pivotally mounting said conveyor frame for pivotal movement about an axis that is substantially parallel to the roll mechanisms and disposed substantially at the location where sheets enter between the roll mechanisms at said infeed end.*

*13. The feeding means of claim 12 which further comprises a fence mechanism movable between a position blocking the path of sheets between the sets of roll mechanisms and a position opening up said path mounted near the set of roll mechanisms at the infeed end of the frame, and means regulating the fence mechanism and said one roll mechanism of the set at the infeed end of the loading conveyor frame whereby said one roll mechanism moves toward said other roll mechanism of the set at the infeed end on movement of said fence mechanism to a position opening up said path and away from said other roll mechanism on movement of said fence mechanism to a position blocking said path.*

References Cited in the file of this patent or the original patent

| | | |
|---|---|---|
| 644,520 | Jones | Feb. 27, 1900 |
| 888,343 | Molyneux | May 19, 1908 |
| 959,996 | Cole | May 31, 1910 |
| 1,809,456 | Streeter | June 9, 1931 |
| 1,959,662 | Ellis | May 22, 1934 |
| 2,414,337 | Shields | Jan. 14, 1947 |
| 2,649,182 | Parker | Aug. 18, 1953 |
| 2,799,381 | Beckley | July 16, 1957 |

FOREIGN PATENTS

| | | |
|---|---|---|
| 474,227 | Canada | June 5, 1951 |